United States Patent
Dornbach et al.

(10) Patent No.: US 7,899,922 B2
(45) Date of Patent: Mar. 1, 2011

(54) ENTERPRISE SERVICE ORIENTED ARCHITECTURE FOR LARGE FILE HANDLING WITH DOCUMENT MANAGEMENT SYSTEM

(75) Inventors: Johann Dornbach, Heidelberg (DE); Michael Roedel, Mannheim (DE); Jens Kehr, Heidelberg (DE); Ernst Berger, Seeheim-Jugenheim (DE); Peter Szincsak, Mannheim (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 11/861,750

(22) Filed: Sep. 26, 2007

(65) Prior Publication Data
US 2009/0083304 A1 Mar. 26, 2009

(51) Int. Cl.
G06F 15/16 (2006.01)
G06F 17/00 (2006.01)

(52) U.S. Cl. .................. 709/230; 709/227; 707/999.01

(58) Field of Classification Search ................. 709/225, 709/227–230, 219; 726/4, 26, 4.26; 707/999.01
See application file for complete search history.

(56) References Cited

U.S. PATENT DOCUMENTS 6,134,552 A * 10/2000 Fritz et al. ........................ 1/1
2006/0265508 A1* 11/2006 Angel et al. ................ 709/230

* cited by examiner

*Primary Examiner* — Peling A Shaw
(74) *Attorney, Agent, or Firm* — Brake Hughes Bellermann LLP (57) ABSTRACT

A computer-implemented method of storing an object received from a client device on one or more content servers remote from the client device includes receiving, through a service oriented (SOA) layer, object metadata about the object from a non-proprietary interface running on the client device and generating a uniform resource locator (URL) with which to retrieve the object. The URL and metadata for locating and retrieving the object from a web application server are transmitted to the client device through the non-proprietary interface, and the metadata for locating and retrieving the object is transmitted through the service oriented architecture (SOA) layer to the client device. The object is received from the client device, and the object is not transmitted through the SOA layer. Finally, the object is stored on at least one of the remote content servers.

18 Claims, 4 Drawing Sheets

ENTERPRISE SERVICE ORIENTED ARCHITECTURE FOR LARGE FILE HANDLING WITH DOCUMENT MANAGEMENT SYSTEM

TECHNICAL FIELD

This description relates to techniques for managing database information, and in particular, to an enterprise service-oriented architecture for large file handling with a document management system.

BACKGROUND

When dealing with many files in a multi-user environment, users may employ enterprise-level software solutions with many integrated functions. A key feature of these large software implementations is their ability to manage multiple versions of objects, governing multi-user access with check-in/check-out systems, and maintaining logical hyperlinks pointing to the most current and context-relevant version of an object or file. As described in U.S. Pat. No. 6,134,552, which is incorporated herein by reference, a Knowledge Provider system (KPRO) can be used to create, update, and maintain a directory of logical objects and their physical counterparts that are stored on a content server separate from the logical objects. This functionality has become essential for enterprise-level file management, though it has traditionally been governed by a complete software system wherein users access these objects through an integrated front-end built into the larger software system.

Today, some users prefer to access files and objects while employing the services of such enterprise-level software implementations, but without using the front-end interface supplied with the enterprise software itself. Such interaction can be supported by Web-based access to services through a Service-Oriented Architecture (SOA) layer. In this SOA implementation, users can employ any interface capable of communicating properly with the SOA layer. Typical examples of acceptable interfaces include common Web browser software, or purpose-coded applications. This form of access, with its inherent freedom to code new applications and to interface with relevant data in the most convenient manner, is increasingly popular.

However, a problem exists with this mode of access. In such implementations, the user-created Web interface is generally capable of communicating only with the SOA layer, not with content servers directly (where files are stored). Thus, if a user wishes to create, save, update or load a file, it is necessary to send a request to the SOA, which in turn communicates with the KPRO to ascertain the location of the physical object on the content server, and then passes an internal request directly to the content servers. Once the file is retrieved, it is passed back through the same channels, via the SOA to the client. Because only the enterprise-level software is capable of communicating with the content servers, a bottleneck can occur when large files are transferred between the user and content servers by way of the SOA and KPRO as intermediaries, particularly when many users are interacting with the enterprise-level software at one time.

SUMMARY

As disclosed herein, this bottleneck can be addressed by the introduction of additional steps in the processes of creating, accessing, editing, or replacing an object stored on a content server. For example, rather than routing all files through the SOA intermediary, a user-generated interface can communicate with the enterprise-level software system (ES) to receive a uniform resource locator (URL) specifying the location of the files on the content server. A user-generated hypertext transport protocol (HTTP) process then can interface directly with the content server(s) to create/load/store the file, and thereafter return control to the KPRO component of the ES to continue generating metadata about the object and otherwise handling it in the manner consistent with its established use.

The net effect is a clearing of the bottleneck, since large files are now transferred directly between the user-coded front-end and the content server(s), and only identifying information, metadata and the object-specific URL are communicated with the SOA. These data are generally considerably smaller than the files themselves, and this is particularly true for large files. Thus, the amount of data transferred through the SOA per user remains low even if very large files are being accessed or transmitted.

According to one general aspect, a computer-implemented method of storing an object received from a client device on one or more content servers remote from the client device includes receiving, through a service oriented (SOA) layer, object metadata about the object from a non-proprietary interface running on the client device and generating a uniform resource locator (URL) with which to retrieve the object. The URL and metadata for locating and retrieving the object from a web application server are transmitted to the client device through the non-proprietary interface, and the metadata for locating and retrieving the object is transmitted through the service oriented architecture (SOA) layer to the client device. The object is received from the client device, and the object is not transmitted through the SOA layer. Finally, the object is stored on at least one of the remote content servers.

In another general aspect, a tangibly embodied computer-readable storage medium includes computer-readable instructions that, when executed, cause a system to receive object metadata about an object from a non-proprietary interface running on a client device, wherein the object metadata is received through a service oriented (SOA) layer, generate a uniform resource locator (URL) with which to retrieve the object, transmit the URL and metadata for locating and retrieving the object from a web application server to the client device through the non-proprietary interface, where the metadata for locating and retrieving the object is transmitted through the service oriented architecture (SOA) layer to the client device, receive the object from the client device, wherein the object is not transmitted through the SOA layer, and store the object on at least one of the remote content servers.

Implementations can include one or more of the following features. For example, the object can be received from the client device due to an HTTP POST command. The method can include creating a directory, adding the object received from the client device to the directory, and transmitting metadata about the directory to the client device through the non-proprietary interface through the SOA layer. The method can include receiving a request to download the object from the one or more content servers and transmitting the object to the client device.

In another general aspect, a computer-implemented method of retrieving an object from one or more remote content servers to a client device includes receiving a request to download a file stored on one or more content servers to a client device, where the request is based on metadata about the requested file and is received through a service oriented (SOA) layer from a non-proprietary interface running on the client device. A uniform resource locator (URL) with which the client device can retrieve the object is generated. The URL and metadata for locating and retrieving the object are transmitted from a web application server to the client device through the non-proprietary interface, and the metadata for locating and retrieving the object is transmitted through the service oriented architecture (SOA) layer to the client device. Finally, the object is transmitted from the one or more remote content servers to the client device, without the object passing through the SOA layer.

In another general aspect, an apparatus for storing an object received from a client system includes a logical object generation engine adapted to receive metadata about a physical object from the client system through a service oriented architecture (SOA) layer and to generate, based on the metadata, a logical object. The apparatus also includes a web application server adapted to maintain the logical object, and a service oriented architecture (SOA) layer adapted to provide an interface between the web application server and the client system. The apparatus additionally includes a remote content server, remote from the client system and operatively connected to the web application server, which is adapted to store the physical object, and a uniform resource locator (URL) generation engine adapted to generate a URL identifying a location of the physical object on the content server. The apparatus also includes a notification engine adapted to transmit, through the SOA layer, metadata about the stored physical object and the URL identifying a location of the physical object from the web application system to the client system. The content server is adapted to receive the physical object from the client system without the physical object passing through the SOA layer and to store the received physical object on the content server in a location identified by the URL.

Implementations can includes one or more of the following features. For example, the web application server can include a database adapted to locally maintain a copy of the logical object. The apparatus can include a plurality of content servers each adapted to receive physical objects directly from one or more client systems without the physical objects passing through the SOA layer and to store the received physical objects on at least one of the content servers. The content server can be adapted to receive or transmit the physical object from the client system in response to a request an HTTP POST request.

The tangibly embodied computer-readable storage medium of claim 18, wherein receiving a request to download the object from the one or more content servers comprises receiving an HTTP GET command, and wherein transmitting the object to the client device comprises transmitting the object in response to the HTTP GET command without the object passing through the SOA layer.

The details of one or more implementations are set forth in the accompanying drawings and the description below. Other features will be apparent from the description and drawings, and from the claims.

DETAILED DESCRIPTION

Figure 1:
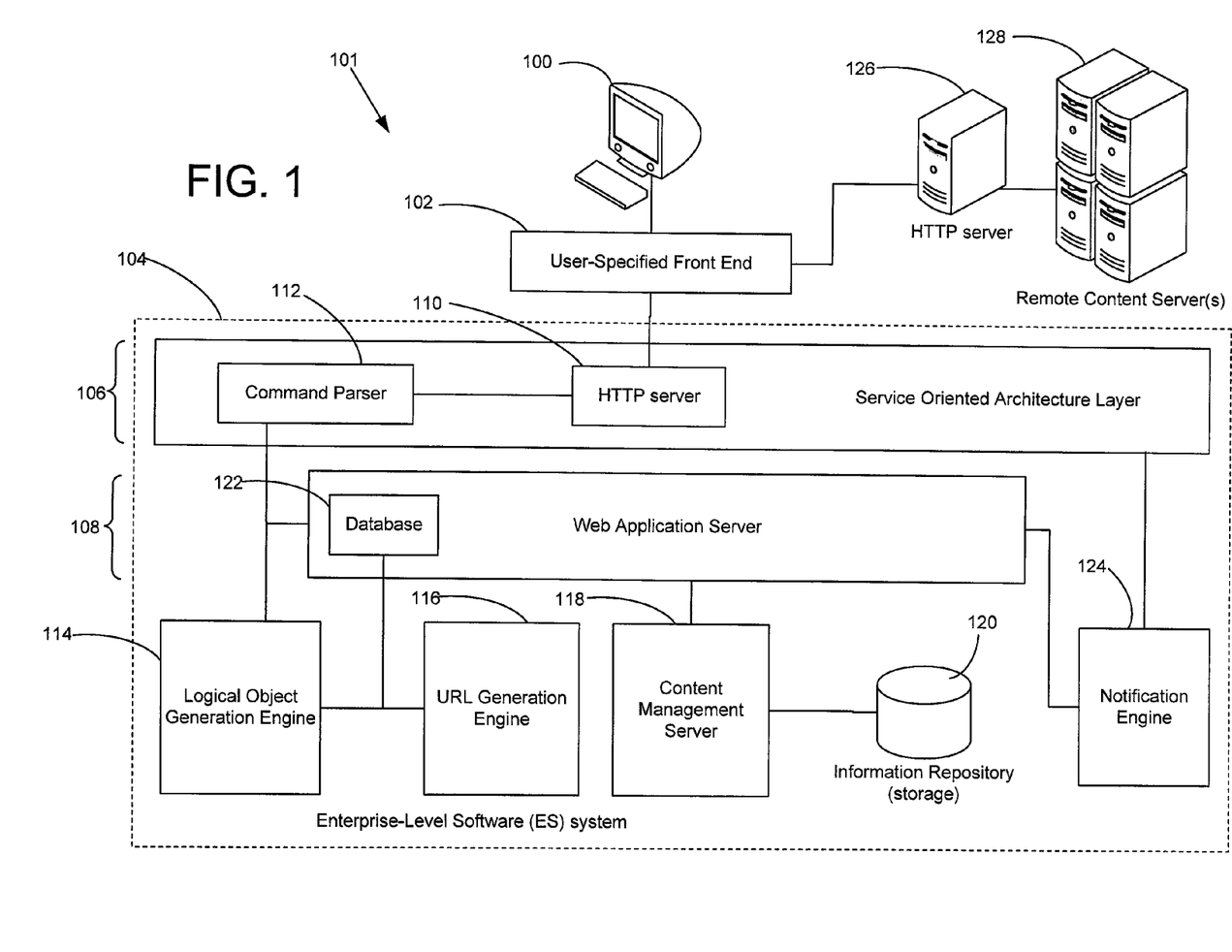
FIG. 1 is a schematic diagram of a system using enterprise service oriented architecture for large file handling with a document management system.

FIG. 1 is a schematic diagram of a system 101 using enterprise service oriented architecture for large file handling with a document management system. Central to the system 101 is an enterprise level software system (ES) 104, which can coordinate a large amount of resources across an organization. For example, the ES 104 may include a product lifecycle management (PLM) system, a customer relationship management (CRM) system, an enterprise resource planning (ERP) system, or a supply chain management (SCM) system. In the example of a PLM system, the ES 104 may coordinate storage, updating, distribution, and sharing of documents, files, and other physical objects that are used to managing the entire lifecycle of a product from its conception, through design and manufacture, to service and disposal. In one example, a PLM system may be required to maintain a large number of interrelated design documents that are created, shared, updated and utilized by a large number of users. Thus, the resource burden on the ES 104 to manage the physical objects needed by the various users of the organization can be quite high.

To offload the burden of routing large files through the ES 104, the system 101 shown in FIG. 1 permits a user to access one or more remote content servers 128 directly through a non-proprietary front end interface 102 whilst continuing to utilize the document management services of the enterprise-level software system 104. In the example of FIG. 1, a user operating a remote client 100, which is remote from the enterprise-level software system 104 and from the content server(s) 128, can interact via the non-proprietary front end 102 with the enterprise-level software system (ES) 104 to view, edit and write physical objects (which can include a single file, a multitude of files, or a directory) on the remote content server 128. The ES 104 can include a service-oriented architecture (SOA) layer 106, a web application server (WAS) 108 and other components, as described in more detail below.

So that the user of the remote client system 100 can interact with the ES 104 and utilize the many features of the ES while retaining the freedom to choose from a variety of non-proprietary front-end user interfaces, the ES includes an SOA layer 106 through which the non-proprietary front end can communicate with the ES. The SOA layer 106 provides an interface between a web application server 108 and the client system 100, allowing the user to employ a variety of non-proprietary front end 102 interfaces whilst interacting with the ES. In particular, the SOA layer 106 makes the functional services provided by the WAS 108 accessible over standard, platform-independent Internet protocols. The non-proprietary front end interface 102 can be a general purpose interface that is used to communicate with the ES 104 and that is not designed especially for use with the ES 104. For example, the front end interface 102 can be a Web browser such as Microsoft's Internet Explorer, Mozilla's Firefox, or Netscape's Navigator that communicates with the ES 104 through the SOA layer 106 via hypertext transfer protocol (HTTP)-based commands. The interface 102 can receive code written in a markup language (e.g., Hypertext Markup Language (HTML) or Extensible Markup Language (XML)) or a scripting language (e.g., JavaScript), which, when executed by the interface 102 provides a graphical user interface (GUI) between the user and the ES 104.

The SOA 106 of the ES 104 can include an HTTP server 110 that is capable of exchanging messages with the client system 100 through the hypertext transfer protocol (HTTP). For example, the HTTP server 100 may receive a request to view a file from the client system 100, or may transmit a response to such a request to the client system. The SOA 106 also can include a command parser 112 that interprets commands received by the HTTP server 110. For example, the command parser 112 may interpret a request from a user to view a file and then may route the interpreted command for response the ES 104.

The system 101 also includes a Web Application Server (WAS) 108 that coordinates the activity of components of the ES 104 and carries out the requests specified by the user-operated client system 100. For example, the WAS 108 may coordinate the activity of components of the ES 104 in response to a request by the user to store a large file to a remote content server 128. The WAS 108 can include a database 122 that maintains copies of metadata, logical objects and uniform resource locators (URLs) generated by or retrieved from components of the ES 108. The database 122 may, for example, maintain a copy of object metadata about, and a URL describing the location of, a physical file to be stored on a remote content server 128.

The system 101 can include a content management server 118 that connects the WAS 108 to a local storage location 120, which enables the WAS 108 to access and manage administrative data about the file system on the remote content server(s) 128. This local storage location is shown in FIG. 1 as an information repository 120 that contains administrative data. For instance, the information repository 120 may contain data about logical and physical objects, object relationships, directory structure and the file system. In one implementation, the content management server 118 can create a Document Info Record (DIR) corresponding to one or more physical files stored on the content server 128, where the DIR is a business object that holds metadata that relate the one or more files stored on the content server. The content management server 118 and information repository 120 provide the user with the benefit of an ES document management system while storing physical objects on remote content servers and without passing them through the ES 104.

The ES 104 can manage direct file transfer between the user-operated client device 100 and remote content servers 128 with the aid of several specialized components. First, the system 101 can contain a logical object generation engine 114 capable of generating a logical object that identifies one or more physical objects. For example, the logical object generation engine 114 may generate a logical object to be stored in the WAS database 122 in response to a request from the command parser 112 and object metadata; this logical object may be associated with, and used to characterize, a file to be uploaded by the user 100 to the remote content server 128. The system also can contain a URL generation engine 116 capable of generating a URL that can be used as a pointer to one or more specific locations on the remote content server. For example, the URL generation engine 116 may generate a URL identifying a location on the remote content server 128, which the user may access to retrieve a physical object. The URL produced by the URL generation engine 116 may be stored in the WAS database 122.

The system 101 contains a notification engine 124 that is adapted to transmit information from the WAS 108 to the client system 102 through the SOA layer 106. For example, the notification engine 124 may transmit object metadata and a URL identifying the location of a physical object stored on the remote content server 128 from the WAS 108 through the SOA layer 106 and the non-proprietary front end 102 to the client system 100.

The system can contain another HTTP server 126 that serves as a gateway to access the remote content server(s) 128. For example, the client system 100 may issue a request via the non-proprietary front-end 102 to view a file stored on the remote content server 128 by sending an HTTP request to the HTTP server 126.

In the system described in FIG. 1, the ES 104 permits the non-proprietary front end 102 to store or fetch files directly from the remote content server 128 while maintaining appropriate administrative data to reflect these transactions in the information repository 120. In this manner, metadata about file objects can be managed by the ES 104 and transmitted to the user via the SOA layer 106, while the act of storing physical files to or reading physical files from the remote content server(s) 128 is performed directly by the client system 100. This permits the maintenance of administrative records for document management by the content management server 118 to be separated from the actual act of reading and writing files to disk storage. Physical file or object content can be distributed among multiple storages 128 accessible through one or more HTTP server(s) 126. Because the physical files typically can be much larger than the metadata that characterize the physical files, this offloading of the physical file handing from the WAS 108 of the ES 104 reduces the resource load on a central component of the ES 104 and distributes the task of physical handling to the many different client systems 100 and content servers 128 used in connection with the ES 104. Thus, the WAS 108 is freed up to perform other tasks for users and therefore can perform faster and more efficiently, which enhances the user's experience when working with the ES 104.

The non-proprietary front-end 102 can be any interface capable of communicating with the ES 104 via the SOA layer 106. Such interfaces can include, for example, a simple third-party Web browser capable of communicating via HTTP (for example, Microsoft Internet Explorer, MICROSOFT Corp, REDMOND WA), other third-party software, custom purpose-written software, computer scripts or instructions any combination of these.

Figure 2:
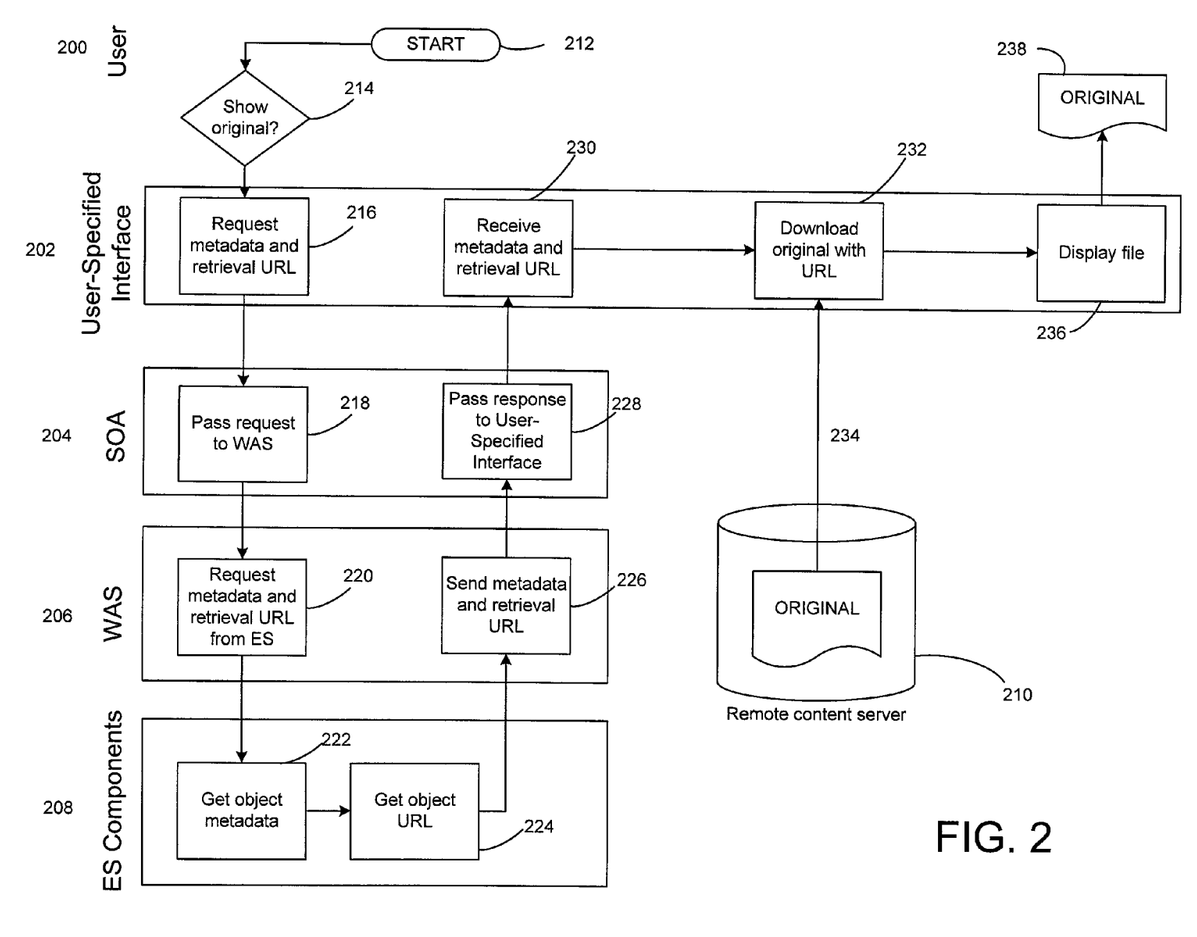
FIG. 2 is a schematic flowchart of the method for viewing large files stored on a remote content server using an enterprise-level document-management software system without passing large files through the enterprise-level software system.

FIG. 2 is a flowchart illustrating example operations of the system in FIG. 1, specifically a method for viewing large files stored on a remote content server using an enterprise-level document-management software system and without passing large files through the enterprise-level software system. This flowchart illustrates a five-level model of user interaction with the ES 104. Steps that occur in different components of the system 101 are shown in different levels in the flowchart of FIG. 2.

As shown in FIG. 2, a user 200 seeking to interact with a file stored on a remote content server 210 can send a request via a non-proprietary interface 202 to the SOA layer 204 of the ES. The SOA layer 204 passes instructions to the WAS 206, which interfaces with ES components 208 to answer the user's request. The reply is passed back through the SOA layer 204 to the non-proprietary interface 202, which then interacts directly with the remote content server 210 to access the requested file 234. The original file 238 is ultimately displayed to the user, thus completing the request.

The user can initiate the process with a decision to view a file (step 214). For example, the user may interact with a graphical user interface (GUI) to select a file from a list and instruct the program to open the file. The non-proprietary interface handles the instruction by requesting object metadata and a retrieval URL (step 216) from the ES via the SOA. For example, the non-proprietary interface may request metadata about a physical object stored on a remote content server, and an appropriate retrieval URL so the file can be requested from said content server directly. In one example formulation, the non-proprietary interface sends this request via HTTP to the SOA HTTP server 110.

The SOA layer 204 then passes the request to the WAS (step 218). The WAS requests object metadata and a retrieval URL from the ES components (step 220). The ES components then fetch object metadata (step 222) and a retrieval URL for the object (step 224). This process of passing the user request through the SOA to the ES components involves several of the entities shown in FIG. 1. In one example formulation, the request from the non-proprietary interface (step 216) is reformulated by the SOA content parser 112 and passed to the WAS 108. The WAS 108 then interfaces with the URL generation engine 116 and the content management server 118 to acquire the retrieval URL for and metadata about the physical object, which is maintained in the database 122, as shown in FIG. 1.

The WAS sends object metadata and the retrieval URL to the SOA (step 226) from whence it is passed to the non-proprietary interface (step 228). The non-proprietary interface receives the metadata and object retrieval URL (step 230). In one example formulation, the non-proprietary interface receives the metadata and object retrieval URL via an HTTP response from the SOA HTTP server 110. At this stage, the ES has returned sufficient identifying information to the non-proprietary interface that the non-proprietary interface can retrieve the file directly from the remote content server.

Using the URL returned by the ES via the SOA, the non-proprietary interface can contact the remote content server with a download request for the original file (step 232). In response to this message, the remote content server can return the requested file to the non-proprietary interface (step 234). In one example formulation, the non-proprietary interface can contact the HTTP server 126 acting as a gateway to the remote content server 128 and sends and HTTP message to the HTTP server 126 to request the file designated by the URL. The content server then can respond by transmitting the file (e.g., via a file transfer protocol (FTP) process) to the non-proprietary interface. In another formulation, the non-proprietary interface can issue an HTTP GET request to the remote content server 128 to retrieve the file directly.

Once transferred to the non-proprietary interface, the file is displayed by the non-proprietary interface along with applicable metadata (step 238). For example, the file may be displayed alone, or displayed with object metadata describing its characteristics and place in the ES document management system, or the contents of a directory, or any combination thereof. The user receives the requested file, thus completing the request (step 238).

This method offers the benefits of using the ES document management system combined with the flexibility of a wide array of supported non-proprietary interfaces and the security of remote content servers, but without causing a bottleneck by routing large files from the content servers through the ES to the user. The original file stored in the remote content server is combined with its descriptive object metadata retrieved from the ES information repository to reconstitute the full array of descriptive information a user is accustomed to receive when requesting a file from the ES. Instead of the ES accessing the file directly upon request and returning the original file via the SOA, the ES retrieves instead a resource locator for the file and enables the user to retrieve the file remotely, thus avoiding the heavy network traffic that accompanies routing large files to a multitude of users through a single channel. Metadata accompanying the file is handled in the same way as if the original file were retrieved and passed to the non-proprietary interface by the ES.

Figure 3:
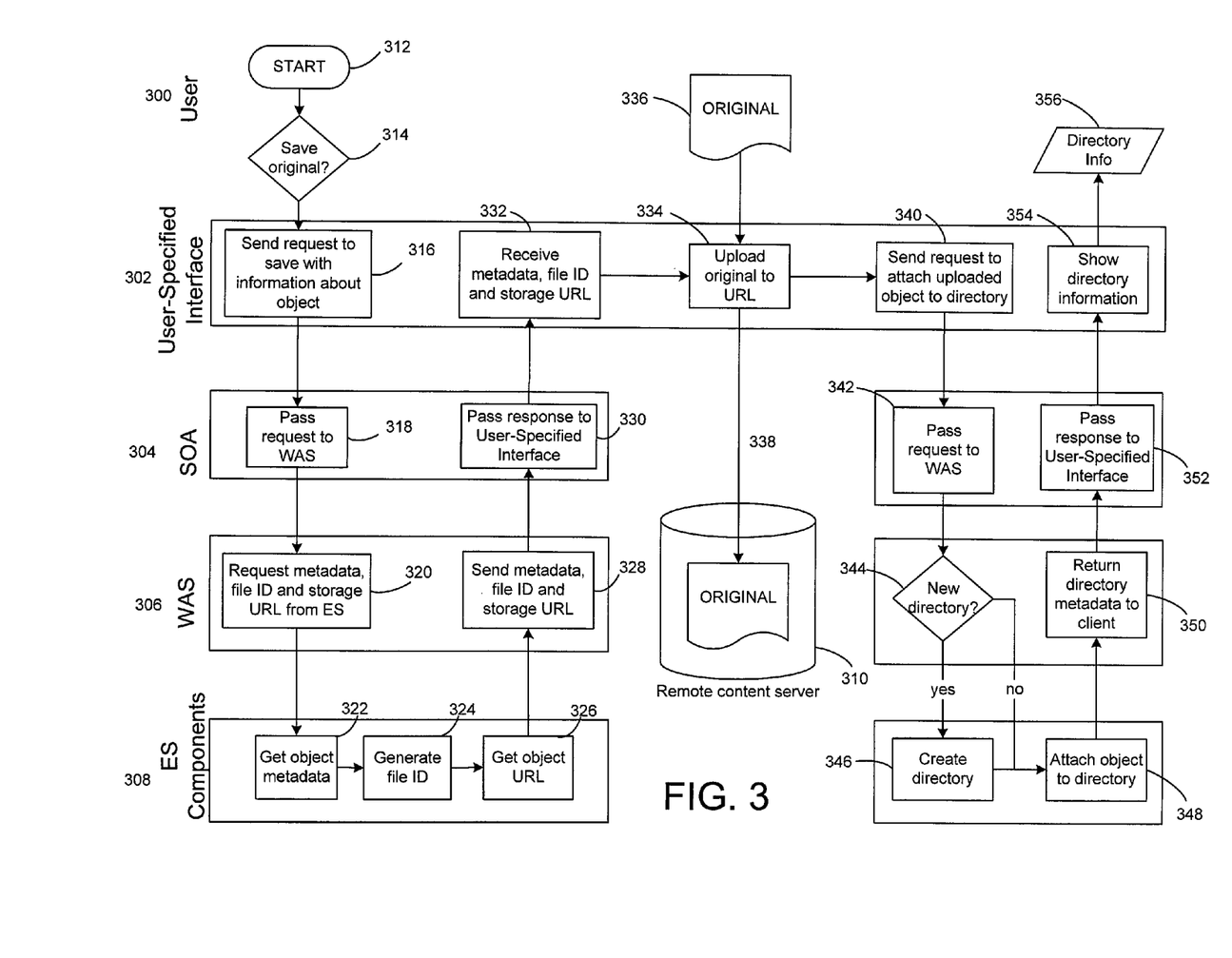
FIG. 3 is a schematic flowchart of the method for storing large files on a remote content server using an enterprise-level document-management software system without passing large files through the enterprise-level software system.

FIG. 3 is a flowchart illustrating example operations of the system in FIG. 1, specifically a method for storing large files on a remote content server 128 using an enterprise-level document-management software system 104 and without passing large files through the enterprise-level software system 104.

Like the operations shown in FIG. 2, this flowchart illustrates a five-level model of user interaction with the ES 104. At the top level is the user 300 who interacts with the ES 104 to store a file on a remote content server 310. The user can send a request to store a physical object (e.g., a file) on a content server via a non-proprietary interface 302 to the SOA layer 304 of the ES. The request to store the file can include information about the file to be stored (for example, the name of the file, the size of the file, the time the file was created, the creator and owner of the file, the language of the file, other file or directories with which the files is associated, etc.). The SOA layer 304 can pass instructions to the WAS 306, which interfaces with ES components 308 to answer the user request. For example, based on the information received from the client system about the file, the WAS 306 can request that metadata be generated by an ES component 308 in a standard format that can be used by the ES 104 to identify, locate, and retrieve the file. The WAS 306 can receive this metadata back from the ES component(s). A reply to the user's request can be passed back through the SOA layer 304 to the non-proprietary interface 302, which then can interact directly with the remote content server 310 to store the file 336. In one implementation, the reply can include the generated metadata information about the file along with a URL to locate the file on the content server. Then, using the metadata received from the WAS 306 through the SOA layer 304 the original file 336 ultimately can be stored to the remote content server 310 in a location identified by the URL, and directory info can be displayed to the user thus completing the operation.

The user can initiate a process with a decision to store a file (step 314). For example, the user may interact with a graphical user interface (GUI) to work with an open file managed by the ES 104 and can instruct the program to save the file. The non-proprietary interface can handle the instruction by passing information about the object (step 316) to the ES 306 via the SOA layer 304. For example, the non-proprietary interface may pass information about the file such as the owner, size, date modified, retrieval URL from which the file was accessed, or other characteristics of the file. In one example formulation, the non-proprietary interface can transmit this information via HTTP to the SOA HTTP server 110.

The SOA layer 304 then can pass the request to the WAS 318. The WAS passes the information about the object to the ES components, and can request further object metadata (e.g., metadata in a standard format that is designed to be used in the ES 104) and a retrieval URL from the ES components (step 320). The ES components then can generate a file identifier for the object (step 324), and return the object metadata (step 322) and a storage URL for the object (step 326).

The WAS can send the file identifier, object metadata and the storage URL to the SOA (step 328) from whence it is passed to the non-proprietary interface (step 330). The non-proprietary interface can receive the file identifier, object metadata and object storage URL (step 332). In one example formulation, the non-proprietary interface can receive the file identifier, metadata and object retrieval URL via an HTTP response from the SOA HTTP server 110. At this stage, the ES would have returned sufficient identifying information to the non-proprietary interface that the non-proprietary interface can store the file directly to the remote content server along with associated metadata that allows the file to be located and retrieved from the content server based on the associated metadata.

Using the storage URL returned by the ES via the SOA, the non-proprietary interface can contact the remote content server with an upload request (step 334) and can attach the original file (step 336). The remote content server can receive the original file from the non-proprietary interface (step 338). In an example embodiment, the remote content server can open a TCP/IP port to allow a file transfer protocol (FTP) connection from the non-proprietary interface to the content server 128. In another example embodiment, the HTTP server 126 acting as a gateway to the remote content server 128 can receive an HTTP POST request from the non-proprietary interface, receive the attached file as HTTP POST data, and pass the attached file to the remote content server for storage.

Once transferred to the remote content server, the file can be stored at a location specified by the URL that had been communicated from the WAS to the client system (step 338). The remote content server can signal the non-proprietary interface that storage is complete. In an example embodiment, the remote content server can return a message via the HTTP server 128 to the non-proprietary interface using HTTP indicating that file transfer and storage were successful.

The non-proprietary interface can send a request to process the file in the ES document management system (step 340). In an example embodiment based upon the SAP system (SAP AG, Walldorf Germany), processing the file in the ES document management system can involve supplying the ES with the confirmed storage location and characteristics of the stored file on the remote content server, followed by the ES assigning the logical object identifier relating to this file to an appropriate directory and updating the appropriate administration data in the Knowledge Provider (KPRO).

The SOA can receive the request to process the file in the ES document management system from the non-proprietary interface and passes the request to the WAS (step 342). A decision can be made about whether a directory needs to be created for storing the file that is to be saved on the remote content server (step 344). In an example embodiment, if the user specifies that a new directory is to be created to house the file, the ES components can generate a new directory in the KPRO (step 346) and attach the logical object identifier relating to the stored file to that directory (step 348). In another example embodiment, if the user instead specifies that the file should be stored in an existing directory, the ES components can attach the logical object identifier associated with the stored file to the appropriate directory (step 348). In both examples, updated directory metadata can be passed from the WAS to the SOA (step 350) and then from the SOA to the non-proprietary interface (step 352). The non-proprietary interface can display the directory information (step 354) so the user receives the directory listing reflecting the uploaded file (step 356).

Thus, after the file has been stored on the content server 128, and the client system and the WAS are aware of the metadata that characterize the file (e.g., the DIR stored on the repository 120 that corresponds to the file), then when the client system 100 or a different client system or user wishes to locate and retrieve the stored file, the client system need only communicate metadata information about the physical file to the WAS, which the WAS can compare to metadata stored in its database 122 or in the repository 120 to determine the location of the physical file. Then the WAS can send a URL linked to the DIR for the desired file to the client through the SOA layer 106, and the client can use the URL to locate and retrieve the file from the content server(s) 128, without the file having to pass through the WAS.

Like the process outlined in FIG. 2, this method offers the benefits of using the ES document management system combined with the flexibility of a wide array of supported non-proprietary interfaces and the security of remote content servers, but without causing a bottleneck by routing large files from the user through the ES to said content servers. The original file opened by the user is stored in the remote content server and combined with its descriptive object metadata in the ES information repository to reconstitute the full array of descriptive information a user is accustomed to working with when saving a file to the ES. Instead of the user transmitting the file to the ES via the SOA to be saved in an operatively-coupled content server, the ES returns a remote storage URL to the non-proprietary interface allowing the non-proprietary interface to store the file directly to the remote content server. This avoids the heavy network traffic that accompanies routing large files from a multitude of users through a single channel. Metadata accompanying the file is handled in the same way as if the original file had been received from the non-proprietary interface by the ES.

Figure 4:
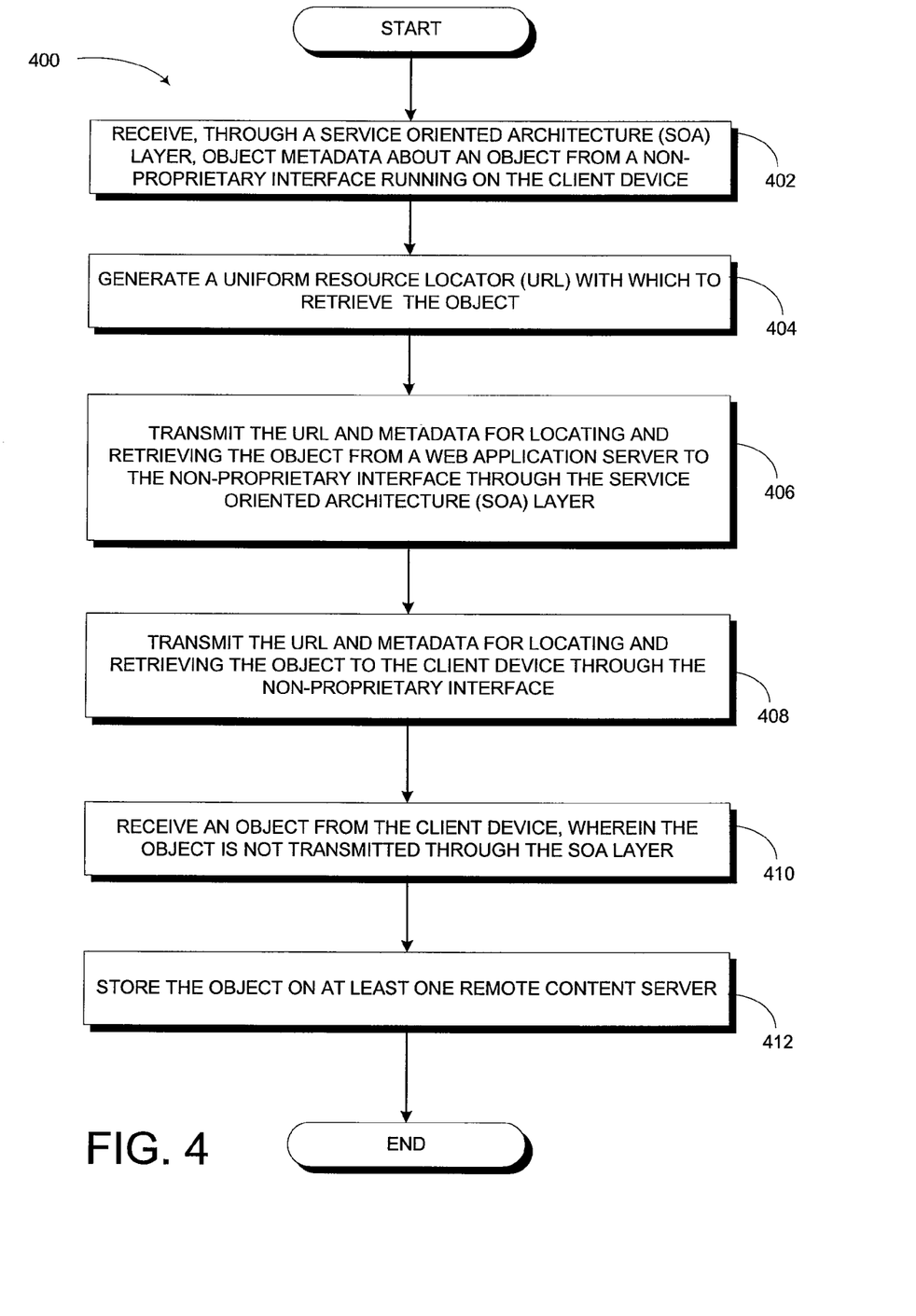
FIG. 4 is an example flowchart of a process of storing an object received from a client device on one or more content servers remote from the client device.

FIG. 4 is an example flowchart of a process of storing an object received from a client device on one or more content servers remote from the client device. In the example of FIG. 4, object metadata about the object is received through the SOA layer from a non-proprietary interface running on the client device (step 402). For example, the client device 100, by way of the non-proprietary interface 102, may send metadata describing a file to be stored on a remote content server 128 to the ES 104 through the SOA layer 106. A uniform resource locator (URL) with which to retrieve the object is generated (step 404). For example, a URL referring to a location on the remote content server 128 could be generated by the URL Generation Engine 116 to direct the client device 100 to said location for storage or later retrieval of the file. The URL and metadata for locating and retrieving the object from a web application server are transmitted to the non-proprietary interface through the SOA layer (step 406) and passed on to the client device (step 408). For example, the URL specifying the location in which to store the file may be passed back to the client 100 by way of the non-proprietary interface 102 and the SOA layer 106. The object is then received from the client device without passing through the SOA layer (step 410). For example, the file to be stored could be sent directly via an HTTP post command or an FTP put command from the client device 100 to the HTTP server 126 or the remote content server 128 using the URL returned by the URL Generation Engine 116. The object is then stored on at least one remote content server (step 412).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method of storing an object received from a client device on one or more content servers remote from the client device, the method comprising:
    receiving object metadata about the object from a non-proprietary interface running on the client device, wherein the object metadata is received through a service oriented architecture (SOA) layer and communicated to a web application server below the SOA layer;
    generating, below the SOA layer, a uniform resource locator (URL) with which to store the object on at least one of the remote content servers and with which to retrieve the object from storage on at least one of the remote content servers;
    transmitting, by the web application server to the client device through the non-proprietary interface, the URL and metadata for locating and retrieving the object from storage on at least one of the remote content servers, wherein the metadata and the URL for locating and retrieving the object are transmitted through the service oriented architecture (SOA) layer to the client device;
    receiving the object from the client device, wherein the object is not transmitted through the SOA layer and the web application server below the SOA layer;
    storing the object on at least one of the remote content servers at a location identified by the URL;
    receiving a request to attach a local object identifier for the stored object to a directory;
    determining whether to create the directory;
    attaching the local object identifier for the stored object to the directory; and
    making the directory, including the local object identifier, available for display on the non-proprietary interface on the client device.

2. The method of claim 1, wherein the object is received from the client device due to an HTTP POST command.

3. The method of claim 1, further comprising:
    creating a directory;
    adding the object received from the client device to the directory; and
    transmitting metadata about the directory to the client device through the non-proprietary interface through the SOA layer.

4. The method of claim 3, further comprising displaying the directory information in the non-proprietary interface.

5. The method of claim 1, further comprising:
    receiving a request to download the object from the one or more content servers; and
    transmitting the object to the client device.

6. The method of claim 5, wherein the request to download the object is received through the SOA layer, and wherein transmitting the object to the client device comprises transmitting the object without the object passing through the SOA layer.

7. The method of claim 5, wherein receiving a request to download the object from the one or more content servers comprises receiving an HTTP GET command, and wherein transmitting the object to the client device comprises transmitting the object in response to the HTTP GET command without the object passing through the SOA layer.

8. A system for storing an object received from a client system, the system comprising:
    a logical object generation engine adapted to receive metadata about a physical object from the client system through a service oriented architecture (SOA) layer and to generate, based on the metadata, a logical object;

a web application server, below the SOA layer, adapted to maintain the logical object;

the service oriented architecture (SOA) layer adapted to provide an interface between the web application server and the client system;

a remote content server, remote from the client system and adapted to store the physical object;

a uniform resource locator (URL) generation engine, below the SOA layer, adapted to generate a URL identifying a location of the physical object on the remote content server; and a notification engine adapted to transmit from the web application server to the client system through a non-proprietary interface, through the SOA layer, metadata about the stored physical object and the URL identifying the location of the physical object, wherein:

the remote content server is further adapted to receive the physical object from the client system, without the physical object passing through the SOA layer and the web application server below the SOA layer, and to store the received physical object on the remote content server in the location identified by the URL, the SOA layer is configured to receive a request to attach a local object identifier for the stored object to a directory, the web application server is configured to determine whether to create the directory, the logical object generation engine is configured to attach the local object identifier for the stored object to the directory, and the notification engine is configured to make the directory, including the local object identifier, available for display on the non-proprietary interface on the client device.

9. The system of claim 8, wherein the web application server comprises a database adapted to locally maintain a copy of the logical object.

10. The system of claim 8, further comprising a plurality of content servers each adapted to receive physical objects directly from one or more client systems without the physical objects passing through the SOA layer and to store the received physical objects on at least one of the content servers.

11. The system of claim 8, wherein the content server is further adapted to receive the physical object from the client system in response to a request an HTTP POST request.

12. The system of claim 8, wherein the content server is further adapted to transmit the physical object to the client system without the physical object passing through the SOA layer in response to a request an HTTP GET request.

13. A tangibly embodied computer-readable storage medium comprising computer-readable instructions that, when executed, cause a system to:

receive object metadata about an object from a non-proprietary interface running on a client device, wherein the object metadata is received through a service oriented (SOA) layer and communicated to a web application server below the SOA layer;

generate, below the SOA layer, a uniform resource locator (URL) with which to store the object on at least one of one or more remote content servers and with which to retrieve the object from storage on at least one of the remote content servers;

transmit, by the web application server to the client device through the non-proprietary interface, the URL and metadata for locating and retrieving the object from storage on at least one of the remote content servers, wherein the metadata and the URL for locating and retrieving the object are transmitted through the service oriented architecture (SOA) layer to the client device;

receive the object from the client device, wherein the object is not transmitted through the SOA layer and the web application server below the SOA layer;

store the object on at least one of the remote content servers at a location identified by the URL;

receive a request to attach a local object identifier for the stored object to a directory;

determine whether to create the directory;

attach the local object identifier for the stored object to the directory; and make the directory, including the local object identifier, available for display on the non-proprietary interface on the client device.

14. The tangibly embodied computer-readable storage medium of claim 13, wherein the object is received from the client device due to an HTTP POST command.

15. The tangibly embodied computer-readable storage medium of claim 13, further comprising computer-readable instructions that, when executed, cause the system to:

create a directory;

add the object received from the client device to the directory; and transmit metadata about the directory to the client device through the non-proprietary interface through the SOA layer.

16. The tangibly embodied computer-readable storage medium of claim 13 further comprising computer-readable instructions that, when executed, cause the system to:

receive a request to download the object from the one or more content servers; and transmit the object to the client device.

17. The tangibly embodied computer-readable storage medium of claim 16, wherein the request to download the object is received through the SOA layer, and wherein transmitting the object to the client device comprises transmitting the object without the object passing through the SOA layer.

18. The tangibly embodied computer-readable storage medium of claim 16, wherein receiving a request to download the object from the one or more content servers comprises receiving an HTTP GET command, and wherein transmitting the object to the client device comprises transmitting the object in response to the HTTP GET command without the object passing through the SOA layer.

* * * * *